Figure 4:
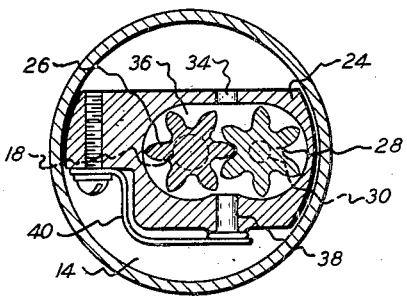

Oct. 18, 1949.

S. A. SNELL 2,484,913

TORQUE ABSORBER FOR SPEED REDUCING
PURPOSES AND THE LIKE
Filed Oct. 5, 1945

Inventor
SAMUEL A. SNELL, DECEASED, BY THE COMMERCE
GUARDIAN BANK, OF TOLEDO, OHIO, NOW, BY
CHANGE OF NAME, COMMERCE NATIONAL
BANK OF TOLEDO, EXECUTOR;

By Beaman & Langford
Attorneys.

Patented Oct. 18, 1949

2,484,913

UNITED STATES PATENT OFFICE 2,484,913

TORQUE ABSORBER FOR SPEED REDUCING PURPOSES AND THE LIKE

Samuel A. Snell, deceased, late of Jackson, Mich., by the Commerce Guardian Bank, executor, Toledo, Ohio, now by change of name, Commerce National Bank of Toledo, assignor to Sam W. Snell, trustee Application October 5, 1945, Serial No. 620,610

5 Claims. (Cl. 192—12)

The present invention relates to improvements in torque absorber for speed reducing purposes and the like.

One of the objects of the invention is to provide a compact, inexpensive device for obtaining speed reduction between the source of power and the driven member.

Another object is to provide a novel hydraulic transmission or torque absorber for speed reducing purposes.

Another object is to provide a transmission capable of receiving power input at a variable R. P. M. and deliver power to a driven member at relative constant R. P. M.

A still further object is to provide a device for installation between a source of variable speed where it is desired to deliver relatively constant speed to a driven member having relatively constant torque requirements.

Further objects and advantages residing in the selective control mechanism, combination and arrangement of parts of the transmission will be more fully understood from a consideration of the following specification and claims.

Figure 6:
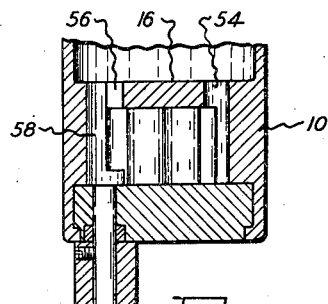
Figure 2:
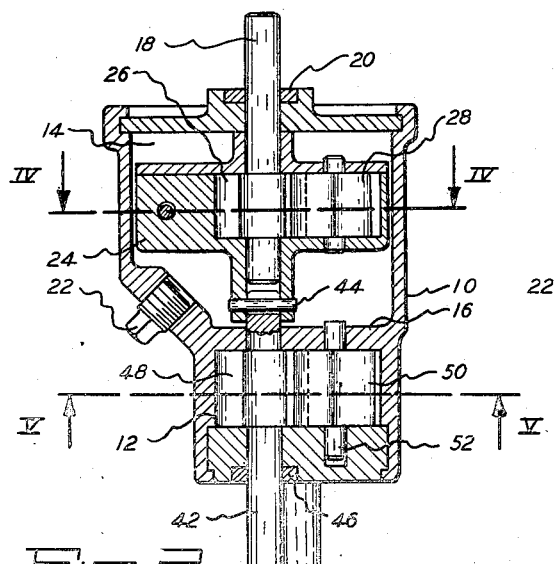
Figure 1:
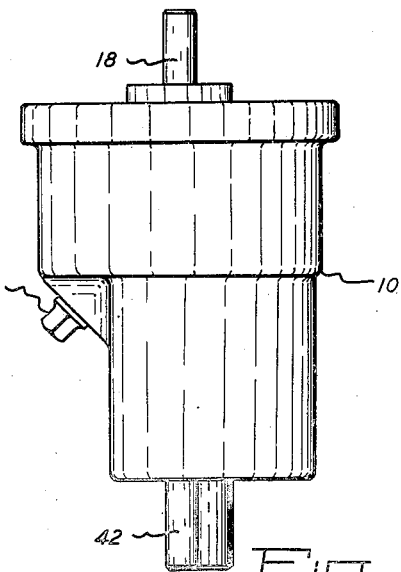
Figure 5:
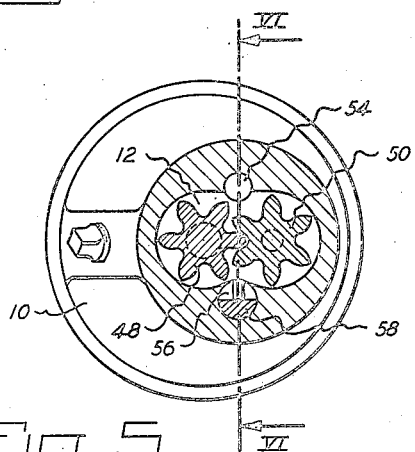
Figure 3:
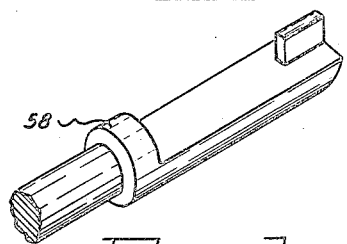

In the drawings:

Fig. 1 is a side elevational view of a transmission unit involving the principles of the present invention, Fig. 2 is a vertical cross-sectional view of the unit shown in Fig. 1, Fig. 3 is a fragmentary enlarged view of the regulating valve, Fig. 4 is a cross-sectional view taken on line IV—IV of Fig. 2, Fig. 5 is a cross-sectional view taken on line V—V of Fig. 3, Fig. 6 is a cross-sectional view taken on line VI—VI of Fig. 5.

Referring to the drawings, the principles of the invention are shown as embodied in a stationary housing 10 comprising two chambers 12 and 14 separated by a wall 16. The input power shaft 18 is provided with some suitable seal 20 and supported in a housing 24 supported for rotation in the chamber 14.

Fixedly mounted on the shaft 18 between the ends thereof is a pump element which preferably takes the form of a gear 26 meshing with another pump element in the form of a gear 28. A shaft 30 supports the gear 28 for rotation in the rotatable housing 24.

The chamber 14 is preferably filled with a suitable hydraulic fluid, as for example that used in hydraulic brakes, through removal of a plug 22. An inlet in the housing 24 is provided at 34 into the chamber 36 containing the gears 26 and 28, which mesh with each other, as more clearly shown in Fig. 4. An outlet 38 in the housing 24 extends between the chamber 36 and the chamber 14. A spring loaded outlet valve 40 controls the passage of fluid through the outlet 38.

The power take-off shaft 42 is shown pinned at 44 to the housing 24. A suitable seal 46 prevents leakage of fluid from the chamber 12 in which is located suitable pump elements, as for example a gear 48 fixed to the shaft 42 and meshing with a gear 50 supported for rotation on the shaft 52 mounted in the casing 10. As is more clearly shown in Fig. 6, an inlet port 54 and an outlet port 56 are provided through the wall 16 between the chambers 12 and 14. An adjustable valve member 58 regulates the outlet 56.

The operation of the transmission or torque absorber above described is as follows:

Rotation of the shaft 18 from suitable sources of power will result in rotation of the gear 26, which in turn will rotate the gear 30 meshing therewith. As the location of the ports 34 and 38 are such as to provide a gear pump action, it will be readily apparent that by driving the shaft 18, the gear pump supported within the housing 24 will have a tendency to circulate the hydraulic fluid in the chamber 14 through the housing 24 by drawing the fluid into the inlet port 34 and discharging it through the outlet port 38. If the fluid is not permitted to readily flow through the ports 34 and 38, the torque upon the shaft 18 is directly transmitted to the housing 24 and the tendency is for the housing 24 to rotate with the shaft 18 more or less as a unit except for the small amount of slippage that may take place within the range of efficiency of the gear pump.

By providing a spring loaded valve 40 for controlling the outlet 38, as soon as a predetermined torque has been transmitted to the housing 24, through the shaft 18, the valve 40 will yield to the pressure built up within the chamber 36 by the gear pump action and fluid will force the valve 40 from its seat and a certain amount will flow through the outlet 38.

Rotation of the housing 24 is directly transmitted to the power take-off shaft 42, which in turn drives the gear pump consisting of the gears 48 and 50 located in the chamber 12. Such rotation results in a flow of fluid through the chamber 12, between the inlet and outlet ports 54 and 56, the fluid being drawn from the chamber 14 and being discharged back into the chamber 14 after passing through the chamber 12. By regulating the adjustable valve 58, controlling the outlet 56, the resistance to rotation of the power take-off shaft 42 may be varied.

With the construction heretofore described, it will be apparent that the tension on the outlet valve 40 may be varied through the selection of the spring of the desired tension with the torque to be transmitted through the device thus determined. Then, by regulating the outlet port 56 through the valve 58, the speed of rotation of the shaft 42 may be varied. It will be understood that the valve 40 will be set to open at a pressure approximately equal to the torque that is desired to be transmitted through the shaft 42.

Assuming that the torque required to be transmitted to the shaft 42 is 40 inch pounds and the speed desired is 60 R. P. M., under these conditions the valve 40 of the gear pump located in the chamber 26 would be designed to open when the internal pressure of the pump reaches the necessary pressure for the desired torque and the outlet port 56 could be adjusted so that a speed of rotation of 60 R. P. M. will produce an internal pressure in the gear pump located in chamber 12 slightly in excess of the pressure required to open the valve 40 of the gear pump located in chamber 26. Under these conditions the pressure developed in the gear pump in the chamber 12 will cause the valve 40 to open permitting the shaft 18 to rotate causing a momentary stoppage or slowing up of the pump housing 24, which is connected to the shaft 42 of the pump located in the chamber 12, and moves in unison therewith. In this manner, the speed of rotation of the take-off shaft 42 is controlled. By increasing the opening through the outlet port 56, a corresponding increase in the R. P. M. of the shaft 42 will result; by decreasing the area of the outlet port 56, a corresponding decrease in the R. P. M. of the shaft 42 will result.

Should the outlet port 56 be fully closed through regulation of the valve 58, the shaft 42 will be more or less held against rotation, within the range of efficiency of the gear pump in the chamber 12, and the pump housing 24 will likewise be held against rotation. However, the shaft 18 will continue to turn and the pump in the chamber 36 will function merely as a pump sucking oil from the chamber 14 and discharging it back into the chamber 14 by virtue of forcing the valve 40 from its seat. If, under these conditions, the outlet 56 is opened slightly, the shaft 42 will rotate slowly as will the pump housing 24. As the area of opening of the outlet 56 is increased, the speed of the shaft 42 increases proportionally until finally shafts 18 and 42 rotate at approximately the same speed disregarding the frictional losses and the amount of power being delivered and consumed through the shaft 42.

It is not to be understood that the device herein described is not considered to be an efficient transmission. Perhaps it might be more accurately described as a torque absorber. It does find usefulness, however, where the control of speed and constant speed delivery is of more importance than the efficiency of power transmission. For example, the device has application for reducing the speed between a source of power of relatively high R. P. M. to a driven member requiring rather low R. P. M. where the efficiency of transmission is secondary. Another field of operation is found in cases where the source of power has a variable speed, as for example, the internal combustion engine of an automobile, and it is desired to utilize the engine as a source of power at a relatively constant R. P. M. For example, the device herein described will find application as a means of driving such accessories as windshield wipers on automobiles wherein the shaft 18 might be connected with the camshaft or some other rotating part of the internal combustion engine having variable speed with relatively constant R. P. M. being delivered to the windshield wiper through the power take-off shaft 42. As the torque requirements for operating windshield wipers will be relatively constant, it should be apparent that by the proper selection of the spring 40 of the outlet valve and through regulation of the valve 58 controlling the port 56, the present invention makes it possible to drive a windshield wiper at relatively constant speed from the engine of an automobile. Other fields of usefulness should readily suggest themselves to those skilled in the various arts.

Having thus described the invention, what is claimed as new and desired to be covered by Letters Patent is:

1. A hydraulic transmission and torque absorber comprising a power input shaft and a power output shaft, an external casing having spaced walls through which said shafts extend and are sealed, a pair of chambers in said casing, a torque transmitter in the form of a gear pump having a pump housing supported for rotation in one of said chambers, a pair of gears in said pump housing, inlet and outlet ports in said pump housing, one of said gears being mounted upon said input shaft, a torque absorber in the form of a second gear pump located in said other chamber, said second pump consisting of a pair of gears one of which is fixed to said power output shaft, inlet and outlet ports communicating between said second gear pump and said first chamber, a connection between said output shaft and said rotatable pump housing, said power output shaft being rotated by the reaction of said first gear pump transmitted through said rotatable housing.

2. A transmission as set forth in claim 1 wherein the outlet port of said first gear pump is controlled by a spring loaded valve.

3. A transmission as defined in claim 1 wherein the outlet of said second gear pump is adjustably controlled.

4. A transmission device as defined in claim 1 where the outlet of said first pump is controlled by a spring loaded valve, and the outlet of said second pump is adjustably controlled.

5. A hydraulic transmission and torque absorber comprising an external casing, a pair of chambers defined in said casing at least one of which acts as a reservoir for hydraulic fluid, coaxial input and output shafts extending into said casing from opposite ends, means sealing said shafts against leakage of hydraulic fluid, a pump housing for rotation in one of said chambers and connected to said output shaft for driving the same with unitary movement, a gear pump in said rotatable pump housing including a gear supported upon said input shaft and driven thereby, a second gear pump located in said other chamber and having a pair of gears, one of which is connected to and driven by said rotatable pump housing inlet ports defined in said pump housing and in said casing and communicating with said reservoir chamber for drawing hydraulic fluid therefrom, outlet ports associated with said gear pumps and communicating with said reservoir chamber for discharging hydraulic fluid thereinto, the reaction of said first gear pump driving said output shaft and said second gear pump, said second gear pump providing a regulating means for controlling the speed of said output shaft.

THE COMMERCE GUARDIAN BANK,
*Executor of the Estate of Samuel A. Snell, Deceased.*
By W. H. BRACKNEY,
*Trust Officer.*

REFERENCES CITED

The following references are of record in the file of this patent:

UNITED STATES PATENTS

| Number | Name | Date |
|---|---|---|
| 2,038,613 | Staats | Apr. 28, 1936 |
| 2,204,589 | Haller | June 18, 1940 |
| 2,224,929 | Wall | June 10, 1941 |

FOREIGN PATENTS

| Number | Country | Date |
|---|---|---|
| 462,507 | Great Britain | Mar. 10, 1937 |